United States Patent
Kunc et al.

(10) Patent No.: US 10,093,067 B2
(45) Date of Patent: Oct. 9, 2018

(54) METHOD OF FORMING A CARBON FIBER LAYUP

(71) Applicant: UT-BATTELLE, LLC, Oak Ridge, TN (US)

(72) Inventors: Vlastimil Kunc, Concord, TN (US);
Randall F. Lind, Loudon, TN (US);
Lonnie J. Love, Knoxville, TN (US)

(73) Assignee: UT-BATTELLE, LLC, Oak Ridge, TN (US)

(*) Notice: Subject to any disclaimer, the term of this patent is extended or adjusted under 35 U.S.C. 154(b) by 675 days.

(21) Appl. No.: 14/533,951

(22) Filed: Nov. 5, 2014

(65) Prior Publication Data

US 2016/0121555 A1    May 5, 2016

(51) Int. Cl.
| | | |
|---|---|---|
| *B29C 70/38* | (2006.01) | |
| *B29C 67/00* | (2017.01) | |
| *B29C 33/44* | (2006.01) | |
| *B29C 33/52* | (2006.01) | |
| *B33Y 10/00* | (2015.01) | |
| *B29K 101/12* | (2006.01) | |

(52) U.S. Cl.
CPC .......... *B29C 70/38* (2013.01); *B29C 33/448* (2013.01); *B29C 33/52* (2013.01); *B29C 67/0055* (2013.01); *B29K 2101/12* (2013.01); *B33Y 10/00* (2014.12)

(58) Field of Classification Search
CPC .............. B29C 70/38; B29C 33/485; B29C 2043/3615; B29C 53/42; B29C 53/50; B29C 53/823; B29C 53/82; B29C 41/08; B29C 67/0055; B29C 67/0074; B29C 67/0081; B29C 67/0051; B29C 67/0062; B29C 67/0077; B29C 67/0092
See application file for complete search history.

(56) References Cited

U.S. PATENT DOCUMENTS

| | | | | |
|---|---|---|---|---|
| 2002/0145061 | A1* | 10/2002 | Newbold | .................. B05C 5/02 |
| | | | | 239/589 |
| 2010/0096072 | A1* | 4/2010 | Hopkins | ............ B29C 67/0092 |
| | | | | 156/155 |
| 2010/0186899 | A1* | 7/2010 | Jackson | .................. B29C 33/10 |
| | | | | 156/382 |
| 2013/0295338 | A1 | 11/2013 | Keating | |

FOREIGN PATENT DOCUMENTS

| | | |
|---|---|---|
| WO | WO 2014/127426 A1 | 8/2014 |
| WO | WO 2014/153535 A2 | 9/2014 |

* cited by examiner

*Primary Examiner* — Stella K Yi
(74) *Attorney, Agent, or Firm* — Pauley Erickson & Kottis

(57) ABSTRACT

A manufactured component, method and apparatus for advanced manufacturing that includes a polymeric working material formed into a mandrel with a carbon fiber overlay formed in a continuation of the process. The mandrel build and the carbon fiber overlay of the component preferably take place at atmospheric temperatures.

15 Claims, 3 Drawing Sheets

METHOD OF FORMING A CARBON FIBER LAYUP

GOVERNMENT RIGHTS

This invention was made with government support under Contract No. DE-AC05-00OR22725 awarded by the U.S. Department of Energy. The government has certain rights in the invention.

FIELD OF THE INVENTION

The present invention relates to a method and system for forming a carbon fiber layup using large scale polymer additive manufacturing.

BACKGROUND OF THE INVENTION

Advanced manufacturing, also referred to as additive manufacturing, may be used to quickly and efficiently manufacture complex three-dimensional components layer-by-layer, effectively forming the complex component. Such advanced manufacturing may be accomplished using polymers, alloys, powders, solid wire or similar feed stock materials that transition from a liquid or granular state to a cured, solid component.

Polymer-based advanced manufacturing is presently accomplished by several technologies that rely on feeding polymer materials through a nozzle that is precisely located over a preheated polymer substrate. Parts are manufactured by the deposition of new layers of materials above the previously deposited layers. Unlike rapid prototyping processes, advanced manufacturing is intended to produce a functional component constructed with materials that have strength and properties relevant to engineering applications. On the contrary, rapid prototyping processes typically produce exemplary models that are not production ready.

In general, advanced manufacturing selectively adds material in a layered format enabling the efficient fabrication of incredibly complex components. Unlike subtractive techniques that require additional time and energy to remove unwanted material, advanced manufacturing deposits material only where it is needed making very efficient use of both energy and raw materials. This can lead to significant time, energy, and cost savings in the manufacture of highly advanced components for the automotive, biomedical, aerospace and robotic industries. In a heretofore separate process, carbon fiber layups used in laminated composite parts are generally made in a labor intensive process in which aligned carbon fibers or carbon fiber sheets are laid layer by layer into a cavity of a mold or around a mandrel. Once the carbon fiber layup is achieved, the carbon fibers and/or sheets of carbon fiber are typically bonded together by a resin or epoxy such that in the final product the carbon fiber is surrounded by the resin and joined to each other. Such embedded fibers are responsible for the stiffness and the loading capacity of the final product whereby the resin supports the fibers laterally.

Both advanced manufacturing techniques and production processes for composite materials generally rely on large ovens or autoclaves for curing thereby constraining the size of the component to be manufactured. In addition, both processes may require movement of the part in process from buildup to curing to layup, thus endangering the integrity of the final build.

In addition, the utilization of an oven or autoclave introduces many limitations. First, the oven requires significant power, especially for higher temperature and larger parts. If materials change, it also takes time to get the oven up to the proper operating temperature. Temperature gradients within the oven introduce distortions and dimensional variability in parts as well. Variations in parts may occur depending upon where in the oven a part is manufactured.

Another constraint introduced by the oven, autoclave or heated bed is a limitation on the build envelope size. Conventional build systems using ovens typically require a limited build size of 36"×36"×24". As such, the resulting builds must fit within this envelope or be constructed in assembled stages thereby increasing complexity and cost and limiting strength and engineering flexibility.

SUMMARY OF THE INVENTION

Development of new materials, extrusion and deposition technologies that enable "oven-less" advanced manufacturing and carbon fiber layup in a single location, within a single work area, and at room or ambient temperatures will provide significant advancement in the state of the art, removing size and temperature constraints from future advanced manufacturing systems. One focus of this invention is the use of carbon fiber reinforcements and layup of a component to aid in structural stability, increased strength and increased stiffness.

According to a preferred embodiment of this invention, a carbon fiber layup is positioned over a component or mandrel constructed of a feed polymer (such as ABS, Nylon, Ultem, etc.). Preferably this process may be accomplished at room temperature without an oven, autoclave or heated table.

As described, polymers may be used in advanced manufacturing to construct a mandrel over which a carbon fiber layup may be positioned, in place and in continuation of the process, on preferably the same equipment as the mandrel. The mandrel can then be removed resulting in a composite part, without the need for movement or transfer of the mandrel to a further layup stage or the requirement of an oven or a heated bed, thus allowing for large scale part production that maintains the integrity of the build and reduces energy usage.

Other objects and advantages will be apparent to those skilled in the art from the following detailed description taken in conjunction with the appended claims and drawings.

DETAILED DESCRIPTION OF THE INVENTION

The present invention provides a component manufactured using an advanced manufacturing process wherein a supply of working material including a carbon-fiber reinforced polymer is provided to a deposition system. The working material is then deposited in a desired position through a nozzle during a build of the component. "Component" as used herein refers to either or both of a mandrel and then a carbon fiber layup on the mandrel to form the component. As used herein, "mandrel" is intended to mean an object of any shape or configuration that is used to provide form to the carbon fiber layup and the resulting component. The build of the component preferably occurs at atmospheric temperature and outside of the confines or limitations of an oven, heated bed or similar system.

Figure 1:
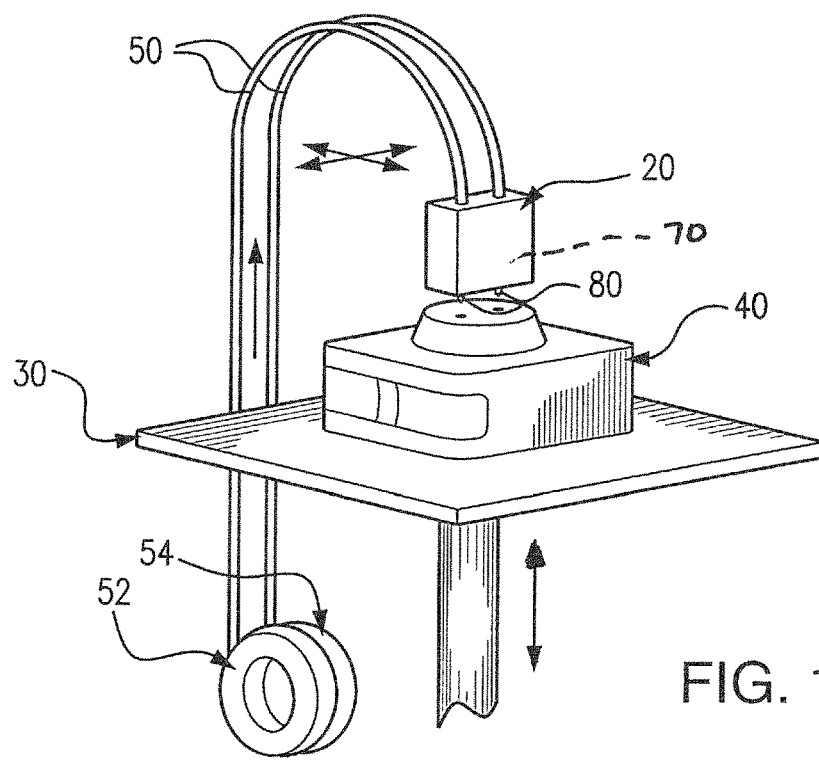
FIG. 1 is a schematic of a conventional polymer extrusion system that feeds a polymer filament into a liquefier to extrude a material.

Polymer extrusion systems feed a polymer filament into a liquefier to extrude a material, such as shown in FIG. 1. Polymer extrusion systems typically use a moveable print head 20 positioned with respect to a work surface 30 to create a desired work piece, component, or part 40. As shown in FIG. 1, a filament 50 may be fed through the print head 20 using drive wheels or a similar mechanism to draw the filament 50 through a heating element 70 to liquefy and extrude the feed material through a nozzle 80 and onto the part 40. As shown in FIG. 1, multiple filaments 50 may be used including a primary material 52 and/or a secondary material 54. In conventional systems, the primary material 52 is often a working material and the secondary material 54 is often a support material. In this manner, complex structures may be constructed using the support material for structural support of the working material within the part 40.

Suitable polymers include, for instance, ABS, polycarbonate, PLA, Ultem, Nylon, or PPSF/PPSU. The control of the motion of the extruder and/or the output of the extruder controls the development of a part. Different materials provide different mechanical properties. For example, ABS is a low cost durable material. Ultem is a very strong, stiff high temperature material ideal for tooling. Polycarbonate is a durable material that can be used for functional parts. PPSF/PPSU is a sterilizable, strong high-performance plastic ideal for biomedical applications.

As described above, these materials typically experience expansion upon melting and contraction upon cooling due to their coefficient of thermal expansion (CTE). If a part is manufactured by depositing hot material over cool material, the constrained cooling manifests itself as residual stress which manifests itself as curl and warp on the finished part. As part sizes get larger, the magnitude of curl and warp increases. Traditionally, conventional fused deposition modeling (FDM) advanced systems use an oven or heated bed to control the part temperature which may be inexact and inconsistent. The subject invention results in a system capable of production at atmospheric temperature.

As used herein, the term "atmospheric temperature" is intended to be synonymous with "room temperature" or "ambient temperature," that is, the temperature inside a temperature-controlled building or the temperature of the surroundings. It is intended that a build according to a preferred embodiment of this invention will occur in a building, room, environment or space that is maintained or exists at temperatures typically between 10° and 30° C. (50° and 86° F.), and, in any event, well below a typical oven temperature of 120° C. (248° F.). The term "atmospheric temperature" is not intended to include elevated temperatures within a chamber or oven or heated plate outside of the range of the surroundings.

Figure 2:
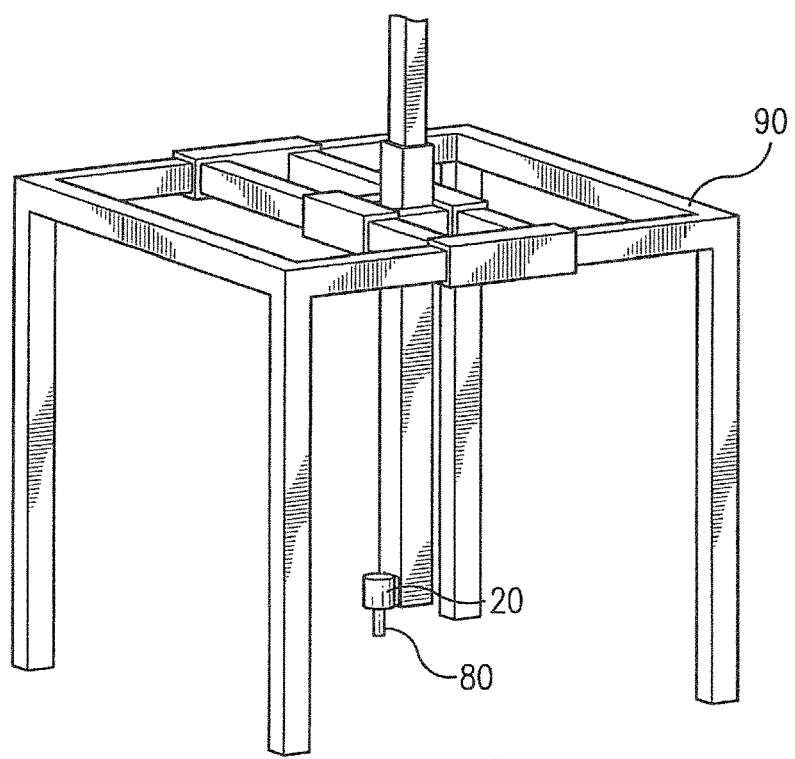
FIG. 2 is a schematic of a gantry according to one embodiment of this invention.

Although not required, the subject invention may be used in connection with large scale polymer advanced manufacturing such as the schematic shown in FIG. 1 and/or a system such as shown in FIG. 2. FIG. 2 shows a frame or gantry 90 for containing a build. The gantry 90 preferably includes a print head 20, such as described above, that is moveable through the x, y and/or z-axis. In another example, the print head 20 is stationary and the part 40 is moveable through the x, y and/or z-axis. In yet another example, the part 40 is also rotatable about the z-axis. The print head 20 preferably accommodates at least one supply of feed or working material, such as a filament 50 or pelletized material, and a deposition nozzle 80. The supply of working material may be onboard the deposition arm and/or remotely supplied from a coil in the case of the filament 50 or a hopper for pelletized material, or similar storage vessel.

According to a preferred embodiment of the invention, a method of advanced manufacturing includes the steps of providing an apparatus for advanced manufacturing, for instance the gantry system shown in FIG. 2. The apparatus preferably includes a nozzle 80 for extruding a material, such as shown in FIG. 1, from a primary material 52 and/or a secondary material 54. The nozzle 80 preferably operably contacts a polymeric working material. An induction coil or alternative heat source may be positioned on or in connection with the nozzle 80 to heat the working material to a desired temperature and/or flow rate. As a result, the nozzle 80 preferably deposits the working material in an appropriate position in space during the build.

Large-scale advanced systems are preferably implemented using the methods described herein. Rather than extruding a filament into a part, the present system may alternatively utilize pelletized raw materials in hoppers or bins to manufacture such parts. Such parts may be manufactured using an extruder that converts pellets to a molten extrusion (rather than a filament to an extrusion).

The ability to manufacture parts at room temperature opens many opportunities for advanced manufacturing systems. First, it is possible to integrate sensors and actuators directly into the deposition head to enable greater capabilities. Sensors can include flow measurement, temperature measurement, vision systems, etc. Actuators can include additional degrees of freedom for the deposition head (tilt and yaw), contouring fixtures to provide a smoother finish, machine tools for final finishing, and other improvements. This was not possible previously due to the high temperature and size limitation within the oven or heated bed. Second, it is possible to expand from manufacturing a part to manufacturing a system. Room temperature deposition enables manufacturing in an open environment. Robotic pick and place equipment can emplace sensors, actuators, batteries, wiring, etc. directly into the structure during the manufacturing process. Finally, room temperature deposition enables boundless size. There is no size limitation due to having to control the build environment (temperature).

Figure 3:
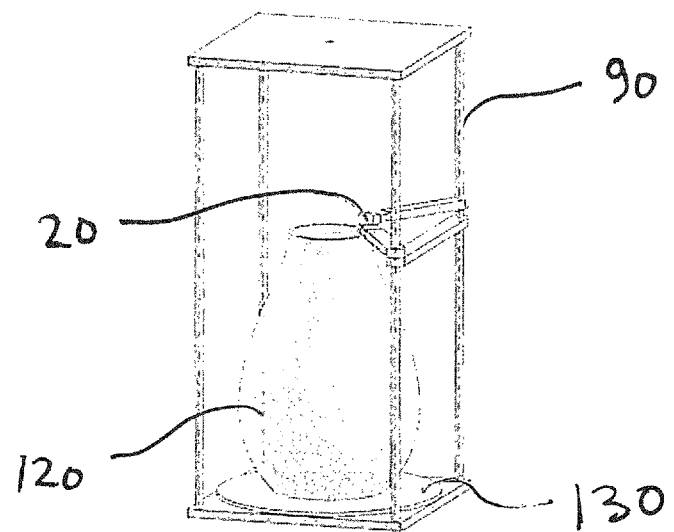
FIG. 3 is a schematic of a gantry and mandrel in process according to one embodiment of this invention.
Figure 4:
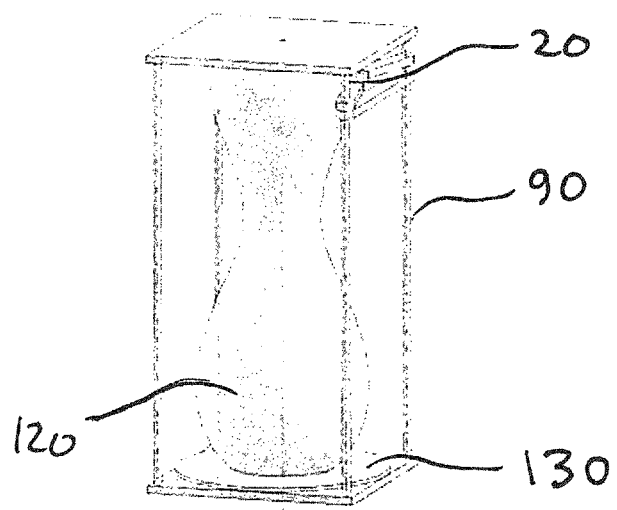
FIG. 4 is a schematic of the gantry shown in FIG. 3 and a fully constructed mandrel.
Figure 5:
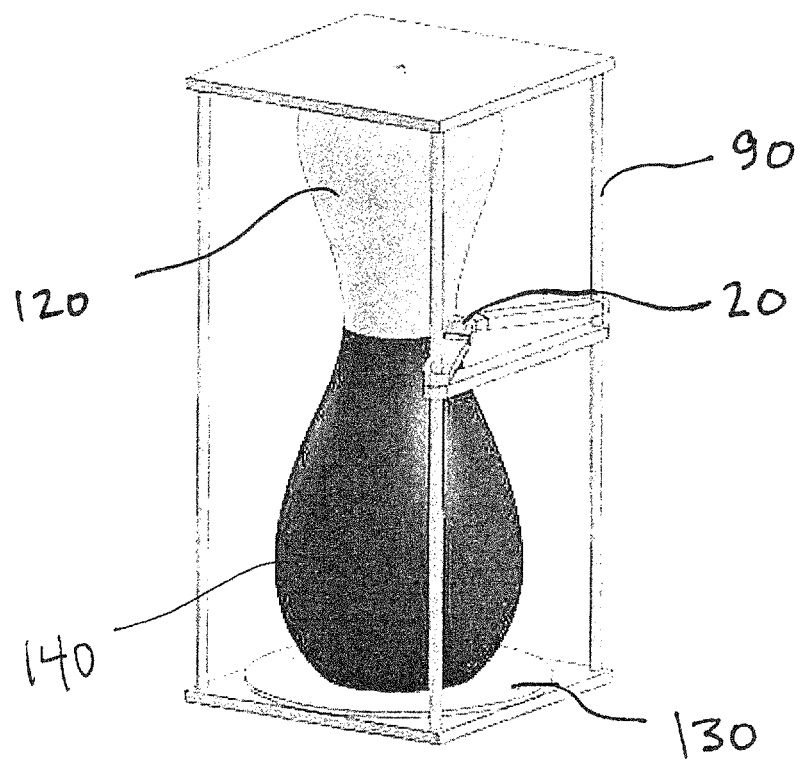
FIG. 5 is a schematic of the gantry shown in FIG. 3 and the component with a partial carbon fiber layup.

FIGS. 3-5 show a build according to one preferred embodiment of this invention. As shown, a print head 20 having a nozzle 80 or similar arrangement within a gantry 90 is preferably used to manufacture a mandrel 120 within a work area 130. The mandrel 120 is preferably manufactured using a technique such as described above. FIG. 3 shows the mandrel 120 under construction within the gantry 90. FIG. 4 shows the mandrel 120 fully constructed within the gantry 90.

According to a preferred embodiment of this invention, once the mandrel 120 is constructed, the carbon fiber layup can begin, preferably within the same work area 130. One or more carbon fiber layers 140 are preferably applied within the gantry 90 to maintain the integrity of both the mandrel 120 and the coordinates required by the print head 20 to continue the layup. Preferably a common gantry 90 is used in both the mandrel 120 build and the carbon fiber layup, in part, to maintain the same datum points/planes. As shown, the carbon fiber layers 140 may be applied with a common print head 20, for instance using supply of carbon fiber as a secondary material 54, in the embodiment described in FIG. 1. The carbon fiber layup may be positioned over the entire mandrel 120 or strategic portions to result in the desired component 40.

Following application of the carbon fiber layers 140, the mandrel 120 may be entirely or partially removed from the carbon fiber layup to result in the completed components. The mandrel 120 may be a shell, a honeycomb, break-away, water soluble or similar construction to permit removal of the mandrel 120 without damaging the carbon fiber of the finished component.

In the manner described, sophisticated large-scale carbon composite components may be manufactured include aerospace vehicles, wind turbine blades, pressure vessels and similar products requiring the strength and other desirable characteristics of carbon fiber composites. Such components are desirably lightweight, strong, stiff and durable.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A method of forming a carbon fiber layup in a fused deposition modeling build comprising:
   providing a supply of thermoplastic working material to a nozzle;
   depositing the thermoplastic working material through the nozzle to form a mandrel within a work area, wherein the build occurs within an unheated work area;
   maintaining a position of the mandrel within the work area;
   applying carbon fiber over the mandrel to form a carbon fiber layup; and
   removing the mandrel from the carbon fiber layup.

2. The method of claim 1 wherein the build occurs entirely within a gantry.

3. The method of claim 1 further comprising heating the thermoplastic working material with a heating element positioned with respect to the nozzle.

4. The method of claim 3 wherein the heating element comprises a coil positioned around the nozzle.

5. The method of claim 1 wherein the thermoplastic working material is provided in pelletized form.

6. The method of claim 1 wherein the thermoplastic working material is provided in a filament.

7. The method of claim 1 wherein the nozzle moves through three axes of travel within the gantry.

8. A process for manufacturing a component using fused deposition modeling comprising the steps of:
   directing a desired flow of a thermoplastic working material onto a work surface within a gantry;
   forming a mandrel with the thermoplastic working material;
   directing a carbon fiber layup over the mandrel within the gantry;
   building up the mandrel and the carbon fiber layup at atmospheric temperature; and
   removing the mandrel to form the component.

9. A process for manufacturing a component using fused deposition modeling comprising the steps of:
   directing a desired flow of a working material onto a work surface within a gantry, wherein the working material comprises at least one of ABS, polycarbonate, PLA, Ultem, Nylon, and PPSF/PPSU;
   forming a mandrel with the working material;
   directing a carbon fiber layup over the mandrel within the gantry;
   building up the mandrel and the carbon fiber layup at an atmospheric temperature between 10 and 30° C.; and
   removing the mandrel to form the component.

10. The process of claim 8 wherein the working material is provided in pelletized form to a nozzle, the nozzle having three axes of movement within the gantry.

11. The process of claim 8 wherein the working material is provided in a filament.

12. The process of claim 8, wherein the working material and the carbon fiber layup are provided through a common print head.

13. The process of claim 8 wherein atmospheric temperature is between 10 and 30° C.

14. The process of claim 9 wherein the working material is provided in pelletized form to a nozzle, the nozzle having three axes of movement within the gantry.

15. The process of claim 9 wherein the working material and the carbon fiber layup are provided through a common print head.

* * * * *